United States Patent [19]

Osawa et al.

[11] 4,285,008
[45] Aug. 18, 1981

[54] COLOR PICTURE REPRODUCING DEVICE

[75] Inventors: Michitaka Ōsawa; Syuzo Matsumoto; Hitoshi Maekawa, all of Yokohama, Japan

[73] Assignee: Hitachi, Ltd., Tokyo, Japan

[21] Appl. No.: 94,735

[22] Filed: Nov. 15, 1979

[30] Foreign Application Priority Data

Nov. 15, 1978 [JP] Japan ................. 53-139895

[51] Int. Cl.³ .................. H04N 5/68; H04N 9/18
[52] U.S. Cl. ........................... 358/65; 358/29
[58] Field of Search .............. 358/29, 34, 64, 65; 315/13 CG

[56] References Cited

U.S. PATENT DOCUMENTS

| | | | |
|---|---|---|---|
| 3,647,944 | 3/1972 | Anderson | 358/34 |
| 3,955,212 | 5/1976 | Engel | 358/65 |
| 4,053,927 | 10/1977 | Schmidtmann | 358/65 |
| 4,082,996 | 4/1978 | Hinn | 358/65 |
| 4,110,787 | 8/1978 | Parker | 358/34 |
| 4,118,731 | 10/1978 | Hinn | 358/65 |
| 4,130,829 | 12/1978 | Kam | 358/65 |
| 4,203,131 | 5/1980 | Harwood | 358/34 |

Primary Examiner—Jin F. Ng
Assistant Examiner—Michael A. Masinick
Attorney, Agent, or Firm—Craig and Antonelli

[57] ABSTRACT

A capacitor is provided between each cathode of a three-electron-gun color picture tube with three first grids earthed and each transistor amplifier for amplifying each primary color signal. The charging voltage across each capacitor is adjusted by a variable resistor provided corresponding to each capacitor. A variable DC voltage is produced at the sliding terminal of each variable resistor. A switch is provided between the sliding terminal and each cathode, which is turned on during the flyback period and the scanning period.

7 Claims, 1 Drawing Figure

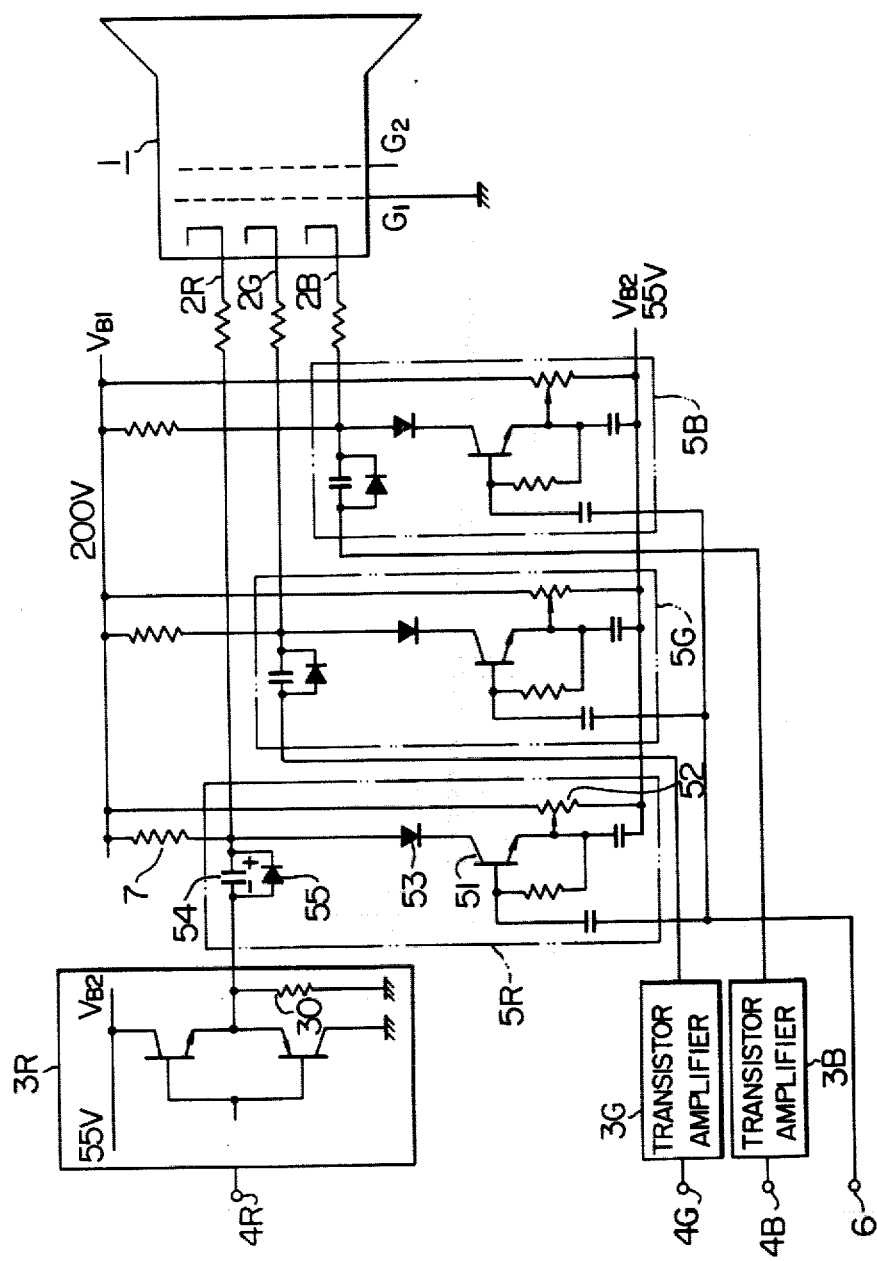

COLOR PICTURE REPRODUCING DEVICE

BACKGROUND OF THE INVENTION

1. Field of the Invention

This invention relates to a color picture reproducing device with a color picture tube.

2. Description of the Prior Art

A color picture reproducing device having a three-electron gun in-line type color picture tube with first grids integrally formed and a color signal amplifier stage for supplying the primary color signals of red, blue and green to the corresponding cathodes of the color picture tube by transistor amplifier circuits, is used in a color television receiver, Model CT-938, manufactured by Hitachi Ltd. Company. In this known color picture reproducing apparatus, the correction of a variation in the cutoff voltages of the respective electron guns, or the adjustment of the white balance in the dark picture, mainly due to the assembling error of the electron guns, is performed by using variable resistors each connected between the emitter and ground of each transistor of which the collector and cathode are connected with each other. Further, the adjustment in the bright picture is performed by using a variable resistor provided between the emitter and the luminance signal supply terminal in order to adjust relatively the amplification degree of each transistor for the remaining transistors. The variation of the cutoff voltages is high, say, 100 V and the drive voltage for the transistor is the sum of a given amplitude voltage, the varied voltage and the first grid voltage. Therefore, in the conventional color picture reproducing apparatus, corresponding to the increment of the drive voltage by the varied voltage, the loss of the transistor or the collector load resistor increases. As the withstand voltage between the collector and emitter of the transistor increases, it is more difficult to manufacture transistors with good high-frequency characteristic. Therefore, transistors manufactured are expensive and uneconomical. Moreover, it makes it difficult to manufacture transistors operable in a wide band of frequency. This results in the picture reproduced with insufficient resolution.

In order to reduce the loss of the transistor, if the collector load resistance is made large, the cutoff frequency of the output circuit determined depending on the output capacity of the transistor, the cathode input capacity, the stray capacity among the wiring, and the collector load resistance, is reduced, leading to the picture reproduced with insufficient resolution.

SUMMARY OF THE INVENTION

Accordingly, an object of the invention is to provide a color picture reproducing device with a low drive voltage and a good frequency characteristic.

In brief, a color picture reproducing device is provided with DC reproducing means which are able to ajust the reproduced DC levels individually, and are respectively provided between the cathodes of a three-electron gun color picture tube with three first-grids supplied with the same voltage and transistors for amplifying primary color signals. The DC level of each primary color signal supplied to the corresponding cathode is adjusted by the DC reproducing means so that the DC levels of the primary colors follow the variation in the cutoff voltages of the electron guns.

With this arrangement, the drive voltage of each transistor is reduced.

BRIEF DECRIPTION OF THE DRAWINGS

The accompanying drawing shows a circuit diagram of an embodiment of a color signal amplifier according to the invention.

DETAILED DESCRIPTION OF THE PREFERRED EMBODIMENTS

In the FIGURE, reference numeral 1 designates a three-electron-gun in line type color picture tube having first grids comprising a grounded plate with three through-holes permitting electrons to pass therethrough. The color picture tube 1 receives at the cathodes 2R, 2G and 2B signals for the three primary colors, red, green and blue. 3R, 3G and 3B are transistor amplifiers with the same construction for amplifying red, green and blue primary color signals supplied to input terminals 4R, 4G and 4B. Of those amplifiers, only the final stage of the transistor amplifier 3R is illustrated in detail. 5R, 5G and 5B are DC reproducing circuits, respectively. Those reproducing circuits are constructed in the same way and hence only the red DC reproducing circuit 5R will be described. As shown, the DC reproducing circuit 5R is comprised of a transistor 51 which is turned on by a synchronizing signal applied to the input terminal 6 and is turned off for the remaining period, a variable resistor 52 for clamp voltage adjustment to divide a DC voltage between $V_{B1}$ and $V_{B2}$, a diode 53 for protecting the transistor 51 from inverse voltage applied thereto, a capacitor 54 having a parallel connection of ceramic capacitor allowing the passage of high frequencies of the primary color and an electrolytic capacitor allowing the passage of low frequencies of the same, and a diode 55 for protecting the capacitor 54 from the inverse voltage applied thereto.

The color picture reproducing device of this embodiment is designed to be adapted for the terminal equipment of a digital data processor.

Each color signal comprises a digital signal having high and low levels respectively corresponding to luminescing and non-luminescing of the fluorescent material of the picture tube, and exhibits a low level during the period of the synchronizing signal. During this synchronizing signal period, the transistor 51 is turned on to clamp the potential at the cathode 2R to a potential of the sliding terminal of the variable resistor 52. Accordingly, the red signal applied to the cathode 2R is so DC-reproduced that its low level becomes the potential at the sliding terminal of the variable resistor 52. Therefore, the DC level of the red signal supplied to the cathode 2R may be adjusted by the variable resistor 52, so that the variation of the cutoff voltage may be corrected.

In other words, the variation in the cutoff voltages of the electron guns is adjusted or corrected by the DC reproducing circuits 5R, 5G and 5B. Accordingly, it is not necessary to correct the variation in the cutoff voltages by the amplifiers 3R, 3G and 3B. This implies that there is no need for the unnecessary increasing of the power source voltage for the amplifiers 3R, 3G and 3B and the load resistances. Thus, the amplifiers 3R, 3G and 3B may be operated effectively.

The DC current components of the primary color signals supplied to the input terminals 4R, 4G and 4B are adjusted by DC reproducing circuits or the like, which are different from the DC reproducing circuits 5R, 5G and 5B, in order that those DC components are positioned at the optimum operating points of the amplifiers 3R, 3G and 3B.

Immediately after the power source switch is turned on, the heater of the color picture tube is insufficiently heated, so that insufficient cathode current flows. As a result, it takes a relatively long time for the cathode voltage to rise by charging the capacitor 54. The fluorescent screen abnormally luminesces, generally. A resistor 7 provided facilitates the charging of the capacitor 54 to prevent such abnormal luminescing phenomenon. The resistance of the resistor 7 is normally large so that it does not affect the normal operation of the device.

As described above, the variation in the cutoff voltage due to assembling error of the electron guns is corrected by the other means than the amplifiers 3R, 3G and 3B. Accordingly, the power source voltage for the amplifiers 3R, 3G and 3B may be smaller than that used in the conventional device, with the result that the power consumption can be lowered and the resistance value of the load resistance 30 can be reduced. Accordingly, the frequency characteristics of the amplifiers 3R, 3G and 3B can be improved due to the reduction of the resistance value. Moreover, because of low power source voltage, semiconductor elements with low withstand voltage may be used for those forming the amplifiers 3R, 3G and 3B. The wide band amplifiers may be realized economically. Additionally, the adjustment for compensating for the variation in the cutoff voltages has not an adverse affect upon the amplifiers 3R, 3G and 3B. Therefore, the operating points of the amplifiers 3R, 3G and 3B may be set optimumly with the minimum difference among the characteristics of the amplifiers 3R, 3G and 3B.

We claim:

1. A color picture reproducing device comprising:
   (a) a three-electron gun color picture tube having first to third grids biased by the same potential and first to third cathodes;
   (b) first to third transistor amplifiers for supplying first to third primary color signals to said first to third cathodes, respectively;
   (c) first to third adjusting means connected to the first to third cathodes for independently adjusting the DC levels of the signals supplied to the respective cathodes;
   (d) wherein each of said first to third adjusting means is a DC reproducing circuit having a capacitor inserted between a transistor amplifier and a respective cathode, a variable voltage source, and a switch connected between a junction point between the cathode and the capacitor, and the variable voltage source, which is turned on during the flyback period and is turned off for the scanning period.

2. A color picture reproducing device according to claim 1, wherein each of said adjusting means includes a diode connected in parallel with the capacitor, with the polarity opposite to that of the voltage for charging the capacitor.

3. A color picture reproducing device according to claim 1, wherein each of said adjusting means includes a charging means connected to the capacitor and having a high impedance to such an extent that the impedance does not affect the primary color signals transmitted.

4. A color picture reproducing device comprising:
   (a) a color picture tube having three electron-guns for three primary colors each having a control grid and a cathode, the respective grids being biased with the same voltage;
   (b) three amplifiers each having an output terminal for amplifying one of three primary color signals, respectively;
   (c) three DC level shift means each provided in correspondence with one of said amplifiers and each having an input terminal connected to said output terminal of the corresponding amplifiers and an output terminal connected to said cathode of the corresponding electron gun representative of one of the primary colors, for causing a level shift between a DC level of a signal appearing at said input terminal and that of a signal appearing at said output terminal thereof; and
   (d) three adjusting means each provided for a respective one of said DC level shift means for independently adjusting the amount of the level shift of said signal in the respective DC level shift means.

5. A color picture reproducing device according to claim 4, wherein each of said adjusting means comprises a variable voltage source and wherein each of said DC level shift means is a DC reproducing circuit having a capacitor inserted between the output terminal of the corresponding amplifier and the cathode of the corresponding electron gun, and a switch connected between a junction point between the capacitor and the cathode, and said variable voltage source, said switch being turned on during a flyback period and turned off during a scanning period.

6. A color picture reproducing device according to claim 5, wherein each of said DC level shift means includes a diode connected in parallel with the capacitor, with the polarity opposite to that of the voltage for charging the capacitor.

7. A color picture reproducing device according to claim 5, wherein each of said DC level shift means includes a charging means connected to the capacitor and having a high impedance to such an extent that the impedance does not affect the primary color signals transmitted.

* * * * *